(12) United States Patent
Pasquero et al.

(10) Patent No.: US 8,914,075 B2
(45) Date of Patent: Dec. 16, 2014

(54) ELECTRONIC DEVICE INCLUDING ACTUATOR AND METHOD OF CONTROLLING SAME FOR PROVIDING TACTILE OUTPUT

(75) Inventors: Jerome Pasquero, Kitchener (CA); Scott James Stobbe, Kitchener (CA); Steven Henry Fyke, Waterloo (CA)

(73) Assignee: BlackBerry Limited, Waterloo (CA)

( * ) Notice: Subject to any disclaimer, the term of this patent is extended or adjusted under 35 U.S.C. 154(b) by 1034 days.

(21) Appl. No.: 12/884,522

(22) Filed: Sep. 17, 2010

(65) Prior Publication Data

US 2012/0071092 A1    Mar. 22, 2012

(51) Int. Cl.
*H04M 1/00* (2006.01)
*H04B 1/38* (2006.01)
*G06F 3/01* (2006.01)
*H04M 1/725* (2006.01)

(52) U.S. Cl.
CPC .............. *H04M 1/7253* (2013.01); *G06F 3/016* (2013.01); *H04M 2250/22* (2013.01)
USPC ...................... 455/567; 455/412.1; 455/412.2; 455/41.2; 455/41.3; 455/550.1; 455/566; 340/407.1; 340/407.2

(58) Field of Classification Search
USPC ......... 455/41.2, 41.3, 412.1, 550.1, 566, 567, 455/90.1, 412.2; 340/7.58, 7.59, 7.6, 407.1, 340/407.2
See application file for complete search history.

(56) References Cited

U.S. PATENT DOCUMENTS

| 4,044,350 | A | 8/1977 | Tretiakoff et al. |
| 7,016,707 | B2 | 3/2006 | Fujisawa et al. |
| 7,130,664 | B1 | 10/2006 | Williams |
| 7,155,241 | B2* | 12/2006 | Helferich ...................... 455/458 |
| 7,289,315 | B2 | 10/2007 | Hillman et al. |
| 7,835,757 | B2* | 11/2010 | Helferich ...................... 455/458 |
| 7,880,729 | B2 | 2/2011 | Lynch et al. |
| 8,077,019 | B2* | 12/2011 | Hofmann et al. .......... 340/407.1 |
| 8,131,275 | B2* | 3/2012 | Kwak et al. ................ 455/414.3 |
| 8,180,296 | B2* | 5/2012 | Flaherty ...................... 455/41.3 |
| 8,315,652 | B2* | 11/2012 | Grant et al. ................... 455/466 |
| 8,519,834 | B2 | 8/2013 | Jersa et al. |
| 2002/0112914 | A1 | 8/2002 | Abe et al. |
| 2002/0121966 | A1* | 9/2002 | Woodard et al. .......... 340/384.6 |
| 2003/0038729 | A1 | 2/2003 | Dunsmore et al. |

(Continued)

FOREIGN PATENT DOCUMENTS

| DE | 102008056751 | 5/2010 |
| JP | 5917881 | 9/1984 |

(Continued)

OTHER PUBLICATIONS

Examiner's Report dated Dec. 20, 2013, issued on corresponding Canadian patent application No. 2,752,323.

(Continued)

*Primary Examiner* — Tuan A Tran
(74) *Attorney, Agent, or Firm* — Geoffrey deKleine; Borden Ladner Gervais LLP (57) ABSTRACT

A method of controlling an electronic device includes detecting receipt of an input, determining a response number in response to receipt of the input, and actuating an actuator of the electronic device a discrete integer number of times based on the response number.

14 Claims, 10 Drawing Sheets

(56) References Cited

U.S. PATENT DOCUMENTS

| | | | |
|---|---|---|---|
| 2003/0151982 | A1 | 8/2003 | Brewer et al. |
| 2004/0201317 | A1 | 10/2004 | Wong |
| 2005/0133347 | A1 | 6/2005 | Hein |
| 2005/0152325 | A1 | 7/2005 | Gonzales |
| 2006/0092177 | A1 | 5/2006 | Blasko |
| 2007/0052691 | A1 | 3/2007 | Zadesky et al. |
| 2007/0057913 | A1* | 3/2007 | Eid et al. .................. 345/156 |
| 2007/0125636 | A1 | 6/2007 | Karan et al. |
| 2007/0236450 | A1 | 10/2007 | Colgate et al. |
| 2007/0265800 | A1 | 11/2007 | Sugai |
| 2008/0062143 | A1 | 3/2008 | Shahoian et al. |
| 2008/0100177 | A1 | 5/2008 | Dai et al. |
| 2008/0192976 | A1 | 8/2008 | Kim |
| 2008/0238879 | A1 | 10/2008 | Jaeger et al. |
| 2009/0072955 | A1 | 3/2009 | Cary |
| 2009/0074224 | A1 | 3/2009 | Wright |
| 2009/0115734 | A1 | 5/2009 | Fredriksson et al. |
| 2009/0180646 | A1 | 7/2009 | Vulfson et al. |
| 2009/0313542 | A1 | 12/2009 | Cruz-Hernandez et al. |
| 2010/0086151 | A1 | 4/2010 | Ruiter |
| 2010/0312521 | A1 | 12/2010 | Sugai |
| 2011/0210834 | A1* | 9/2011 | Pasquero et al. ........... 340/407.1 |
| 2012/0044062 | A1 | 2/2012 | Jersa et al. |
| 2012/0087523 | A1 | 4/2012 | Gerkinsmeyer |

FOREIGN PATENT DOCUMENTS

| | | |
|---|---|---|
| JP | 5288868 | 11/1993 |
| JP | 7218663 | 8/1995 |
| WO | 2004/053830 A1 | 6/2004 |

OTHER PUBLICATIONS

The Search and Examination Report dated Feb. 14, 2011, issued in respect of the corresponding European application.

Wang, Q. et al., "Biomechanically Optimized Distributed Tactile Transducer Based on Lateral Skin Deformation" Haptics Laboratory, Center for Intelligent Machines, McGill University, Montreal, Canada, published at least as early as Apr. 2010.

http://www.touchuserinterface.com/2009/04/touch-screens-and-vision-impaired.html, published at least as early as Apr. 1, 2009.

http://www.newscientist.com/article/mg20127015.700-vibrating-touch-screen-puts-braille-at-the-fingertips.html, published at least as early as Mar. 31, 2009.

www.edn.com/article/459376-Touch_screen_controller_provides_tactile_feedback.phps, published at least as early as Aug. 6, 2009.

www.pacinian.com/file_viewer.php?id=215, published at least as early as Oct. 2009.

http://www.phoenix.tc-ieee.org/004_Piezo_Film_Blood_Flow_Sensor/Phoenix_PiezoPulse.htm, published at least as early as Sep. 19, 2005.

http://www.yankodesign.com/2007/08/07/all-in-one-haptic-phone/, published at least as early as Aug. 2007.

Blasko et al., "An Interaction System for Watch Computers Using Tactile Guidance and Bidirectional Segmented Strokes", Eighth International Symposium on Wearable Computers, ISWC, Oct. 31-Nov. 3, 2004, pp. 120-123.

Kim et al., "The Gesture Watch: A Wireless Contact-free Gesture based Wrist Interface", 11th IEEE International Symposium on Wearable Computers, Boston, MA, Oct. 11-13, 2007, pp. 15-22.

Lee et al., "Mobile Gesture Interaction Using Wearable Tactile Displays", CHI 2009, Student Research Competition, Boston, MA, Apr. 4-9, 2009, pp. 3437-3442.

European Patent Application No. 10172092.8, European Search Report dated Jan. 12, 2011.

* cited by examiner

ELECTRONIC DEVICE INCLUDING ACTUATOR AND METHOD OF CONTROLLING SAME FOR PROVIDING TACTILE OUTPUT

FIELD OF TECHNOLOGY

The present disclosure relates to a method of controlling an electronic device including an actuator for providing tactile output.

BACKGROUND

Electronic devices, including portable electronic devices, have gained widespread use and may provide a variety of functions including, for example, telephonic, electronic text messaging and other personal information manager (PIM) application functions. Portable electronic devices can include several types of devices including mobile stations such as simple cellular phones, smart phones, Personal Digital Assistants (PDAs) in various forms, and peripheral devices for communicating with PDAs.

Devices such as PDAs or smart phones are generally intended for handheld use and ease of portability. Smaller devices are generally desirable for portability. Peripheral devices such as watches or other peripheral devices that may communicate with PDAs or other electronic devices are desirable for their small overall size and convenience.

Improvements in control of such electronic devices are desirable.

BRIEF DESCRIPTION OF THE DRAWINGS

Embodiments of the present disclosure will now be described, by way of example only, with reference to the attached Figures, wherein.

DETAILED DESCRIPTION

The following describes a method of controlling an electronic device. The method includes detecting receipt of an input, determining a response number in response to receipt of the input, and actuating an actuator of the electronic device a discrete integer number of times based on the response number.

It will be appreciated that for simplicity and clarity of illustration, where considered appropriate, reference numerals may be repeated among the figures to indicate corresponding or analogous elements. In addition, numerous specific details are set forth in order to provide a thorough understanding of the example embodiments described herein. However, it will be understood by those of ordinary skill in the art that the example embodiments described herein may be practiced without these specific details. In other instances, well-known methods, procedures and components have not been described in detail so as not to obscure the example embodiments described herein. Also, the description is not to be considered as limited to the scope of the example embodiments described herein.

Figure 1:
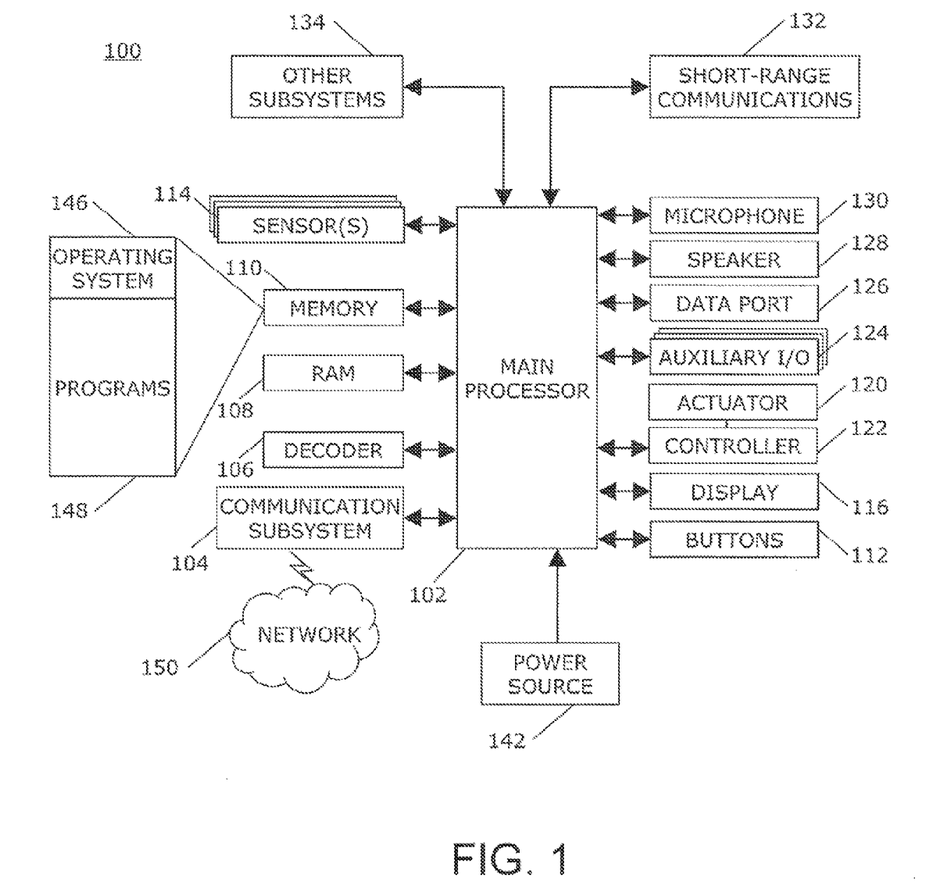
FIG. 1 is a simplified block diagram of components including internal components of a portable electronic device according to an example embodiment.

FIG. 1 shows a simplified block diagram of components including internal components of one example of a portable electronic device. The portable electronic device 100, which may be in the form of, for example, a watch, includes multiple components such as a processor 102 that controls the operations of the portable electronic device 100. Communication functions, including data and voice communications, are performed through a communication subsystem 104. Data received by the portable electronic device 100 is decompressed and decrypted by a decoder 106. The communication subsystem 104 receives messages from and sends messages to a wireless network 150. The wireless network 150 may be any type of wireless network, including, but not limited to, data-centric wireless networks, voice-centric wireless networks, and dual-mode networks that support both voice and data communications over the same physical base stations. The portable electronic device 100 is a battery-powered device and includes a power source 142 such as a rechargeable battery or batteries.

The processor 102 also interacts with additional subsystems such as a Random Access Memory (RAM) 108, memory 110, buttons 112, sensors 114, a display 116, an actuator 120, an auxiliary input/output (I/O) subsystem 124, a data port 126, a speaker 128, a microphone 130, short-range communications 132 and other device subsystems 134. User interaction with the graphical user interface of the portable electronic device 100 is performed through the buttons 112 and the sensors 114. The processor 102 may interact with the actuator 120 through a controller 122. The processor 102 may interact with the sensors 114 via an electronic controller. Information, such as text, characters, symbols, images, icons, and other items that may be displayed or rendered on a portable electronic device, is displayed on the display 116 via the processor 102.

To identify a subscriber for network access according to the present embodiment, the portable electronic device 100 may use a Subscriber Identity Module or a Removable User Identity Module (SIM/RUIM) card for communication with a network such as the wireless network 150. Alternatively, user identification information may be programmed into memory 110.

The portable electronic device 100 includes an operating system 146 and software programs or components 148 that are executed by the processor 102 and are typically stored in a persistent, updatable store such as memory 110. Additional applications or programs may be loaded onto the portable electronic device 100 through the wireless network 150, the auxiliary I/O subsystem 124, the data port 126, the short-range communications subsystem 132, or any other suitable subsystem 134.

In use, a received signal such as a text message, an e-mail message, or web page download is processed by the communication subsystem 104 and input to the processor 102. The processor 102 then processes the received signal for output to the display 112 or alternatively to the auxiliary I/O subsystem 124. A subscriber may also compose data items, such as e-mail messages, for example, which may be transmitted over the wireless network 150 through the communication subsystem 104. For voice communications, the overall operation of the portable electronic device 100 is similar. The speaker 128 outputs audible information converted from electrical signals, and the microphone 130 converts audible information into electrical signals for processing.

The sensors 114 may be any suitable sensors such as capacitive sensors including a capacitive sensor layer or layers of suitable material such as indium tin oxide (ITO). The sensors 114 may be located on a periphery of the face of the portable electronic device 100, as illustrated in the front view of the portable electronic device shown in FIG. 2. One or more touches, on the touch sensors, also known as touch contacts or touch events, may be detected. A location of the touch may be determined based on the sensor at which the touch is detected. A signal is provided to the controller 116 in response to detection of a touch. A touch may be detected from any suitable object, such as a finger or thumb. The electronic controller, through which the sensors interact with the processor 102, and/or the processor 102 may detect a touch and multiple simultaneous touches may be detected.

Figure 2:
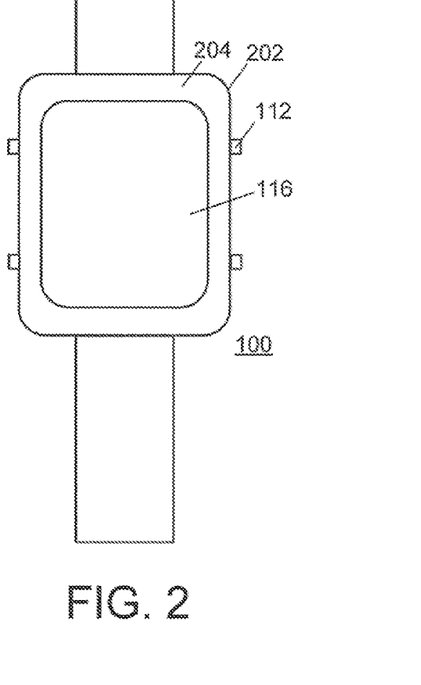
FIG. 2 is a front view of an example of a portable electronic device.
Figure 3:
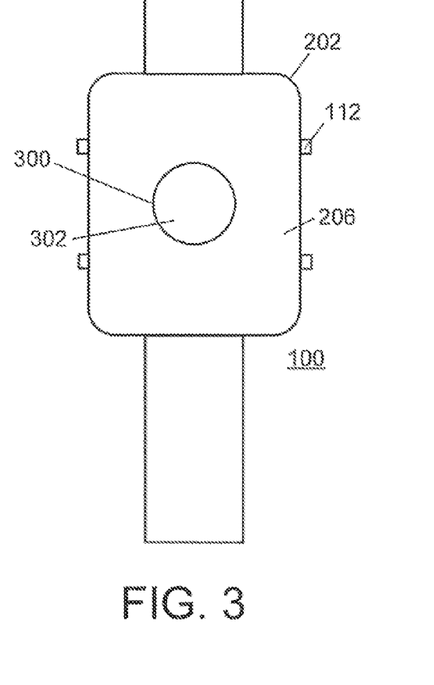
FIG. 3 is a back view of an example of a portable electronic device.

Referring to FIG. 2 and FIG. 3, a front view and back view of the portable electronic device 100, which in the present embodiment is in the shape of a watch and is normally worn at or near the wrist of a user, are shown. The portable electronic device 100 includes a housing 202 that houses the internal components shown and described above with reference to FIG. 1. The housing 202 includes a front frame 204 and a back 206, joined by sidewalls that extend between the front frame 204 and the back 206. The housing 202 may be made of any suitable material such as, for example, a high density plastic. The front frame 204 frames the display 116 and the sensors 114 (shown in FIG. 1) are distributed on or around the front frame 204.

In the example shown in FIG. 2 and FIG. 3, four buttons 112 extend from two opposing sidewalls, although any suitable number of buttons may be utilized. Alternatively, the portable electronic device 100 may be without such buttons.

The back 206 of the portable electronic device 100 in the example shown in FIG. 2 and FIG. 3, includes an opening through which a cover 302 of an actuator assembly 300 is exposed. In the present example, the opening is circular and the actuator assembly 300 is disposed in the opening such that an outer surface of a cover of the actuator assembly 300, is generally flush with the remainder of the back 206 of the portable electronic device 100. Alternatively, the cover may extend across the entire back of the portable electronic device 100 rather than at an opening in the back.

Figure 4:
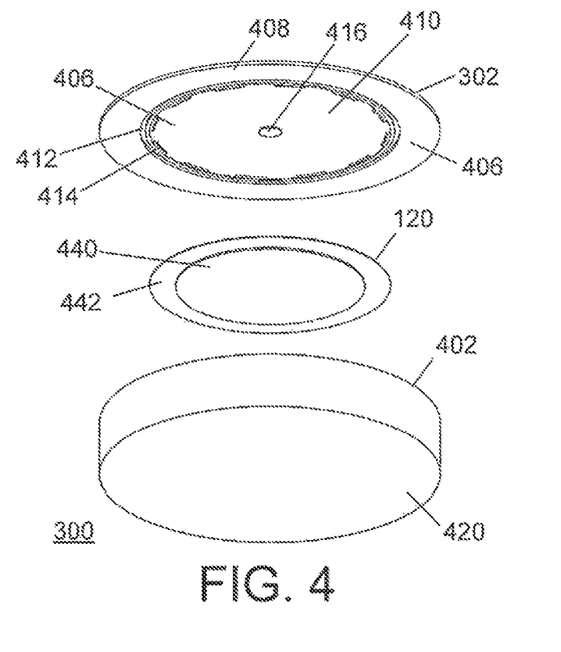
FIG. 4 is an exploded view of an example actuator assembly of the portable electronic device in accordance with an example embodiment.
Figure 5:
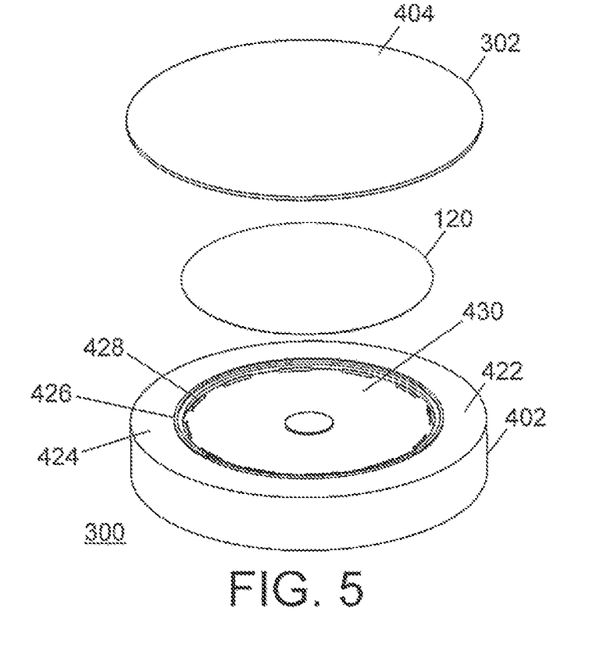
FIG. 5 is another exploded view of the example actuator assembly of the portable electronic device.

FIG. 4 and FIG. 5 show exploded perspective views of an example of the actuator assembly 300, including the cover 302, the actuator 120, and a base 402. As described, the cover 302 is exposed at the back 206 of the housing 202 (shown in FIG. 3) of the portable electronic device 100. The cover 302 is supported by and coupled to the base 402. The actuator 120 is disposed between the base 402 and the cover 302.

The cover 302 is generally planar on the outer surface 404, which is exposed at the back 206 of the housing 202 (shown in FIG. 3). Alternatively, the cover 302 is shaped, for example, to fit or curve around a wrist. The inner surface 406 is shaped to provide support and flexibility. The inner surface 406 of the cover 302 includes a peripheral rim 408 that is thick to provide support for a flexible membrane 410 which is centered within and coaxial with the rim 408. The rim 408 includes a groove 412 that extends around the rim 408 to mate with a cylindrical projection from the base 402. A plurality of spaced apart raised lips 414 on the inner surface 406, extend around the margin of the membrane 410. A cylindrical protrusion 416 extends from a center of the membrane 410 on the inner surface 406. The membrane 410 is thin compared to the rim 408, the raised lips 414 and the cylindrical protrusion 416, to facilitate elastic deformation of the membrane 410, for example, when a force is imparted to the cylindrical protrusion 416. The cover 302 is greater in thickness at the cylindrical protrusion 416 than at the remainder of the membrane 410 to provide a reinforced area at which the actuator strikes the cover 302.

The base 402 is generally planar on an outer surface 420, on an opposite side of the base 402 as the cover 302. The inner surface 422 includes a peripheral rim 424 that includes a tongue 426 that protrudes from and extends around an interior edge of the peripheral rim 424. The tongue 426 is sized and shaped to mate with the groove 412 of the cover 302. A plurality of spaced apart teeth 428 extend around the margin of a tray 430 which is centered within a coaxial with the rim 424. The teeth 428 are sized, shaped, and located to cooperate with the raised lips 414 of the cover 302 and spaced therefrom, to clamp the actuator 120 therebetween. The base 402 is sized to support the actuator 120 and the cover 302, and is supported within the housing 202 of the portable electronic device 100. Alternatively, the base 402 may be incorporated into the housing.

The actuator 120 includes a piezoelectric disk 440 such as a PZT ceramic disk adhered to a metal substrate 442 of larger diameter than the piezoelectric disk 440 for bending when the piezoelectric disk 440 contracts diametrically as a result of build up of charge across the piezoelectric disk 440. The actuator 120 is electrically connected to a piezo driver that communicates with the controller 122. The controller 122 may be a microcontroller that communicates with the processor 102. Alternatively, the processor 102 may control the actuator 120. The controller 122 controls the piezo driver that controls the current/voltage to the piezoelectric disk 440 of the actuator 120. When the charge is reduced by a discharge current/voltage, the actuator 120 returns to the state in which the actuator is not actuated, i.e., the actuator 120 is not bent.

Figures 6, 7:
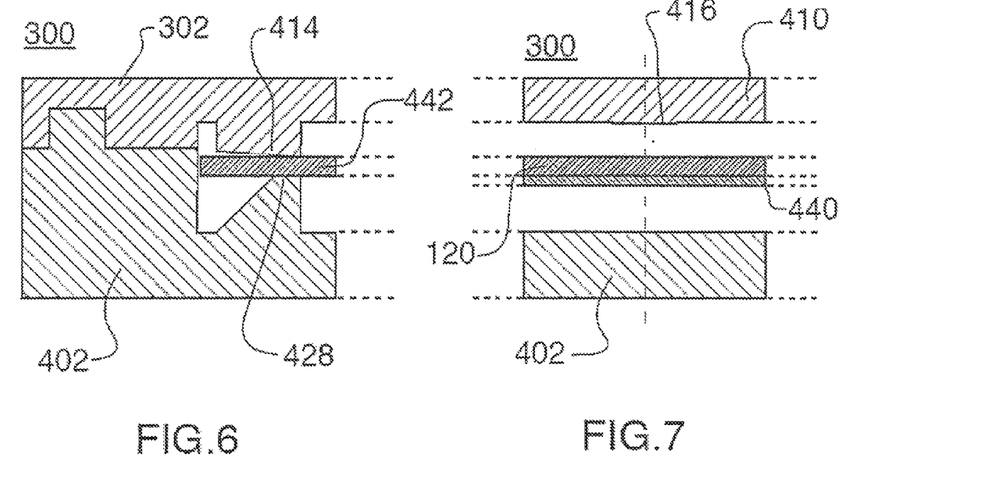
FIG. 6 is a partial sectional view at an edge of the actuator assembly, when the actuator is not actuated.
FIG. 7 is a partial sectional view at a center of the actuator assembly, when the actuator is not actuated.
Figures 8, 9:
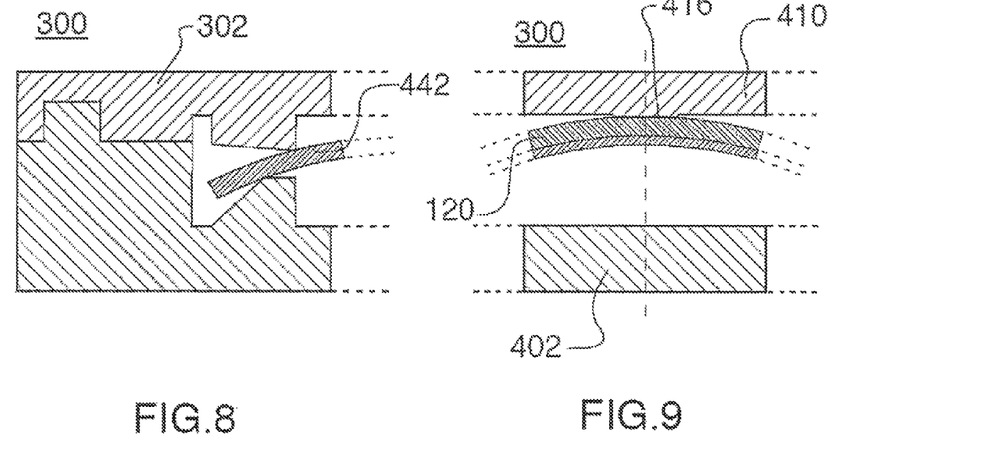
FIG. 8 is a partial sectional view at an edge of the actuator assembly, when the actuator is actuated.
FIG. 9 is a partial sectional view at center of the actuator assembly, when the actuator is actuated.

Reference is now made to FIG. 6 and FIG. 7, which show partial sectional views at an edge of the example of the actuator assembly 300 and a center of the actuator assembly 300, respectively. The membrane 410 is spaced from the base 402. The metal substrate 442 of the actuator 120 is disposed between the teeth 428 of the base 402 and the raised lips 414 of the cover 302 such that the actuator is spaced from the membrane 410 when the actuator 120 is not actuated, as illustrated in FIG. 7. Referring now to FIG. 8 and FIG. 9, which show partial sectional views of one side of the actuator assembly 300 and a center of the actuator assembly 300, respectively, when the actuator 120 is actuated. The current/voltage to the actuator 120 is controlled by the controller to increase the charge across the piezoelectric disk 440 of the actuator 120 and thereby actuate the actuator 120 over a very short period of time. The actuator 120 bends when the charge across the piezoelectric disk increases and the actuator 120 strikes the cylindrical protrusion 416 in the center of the membrane 410.

Figure 10:
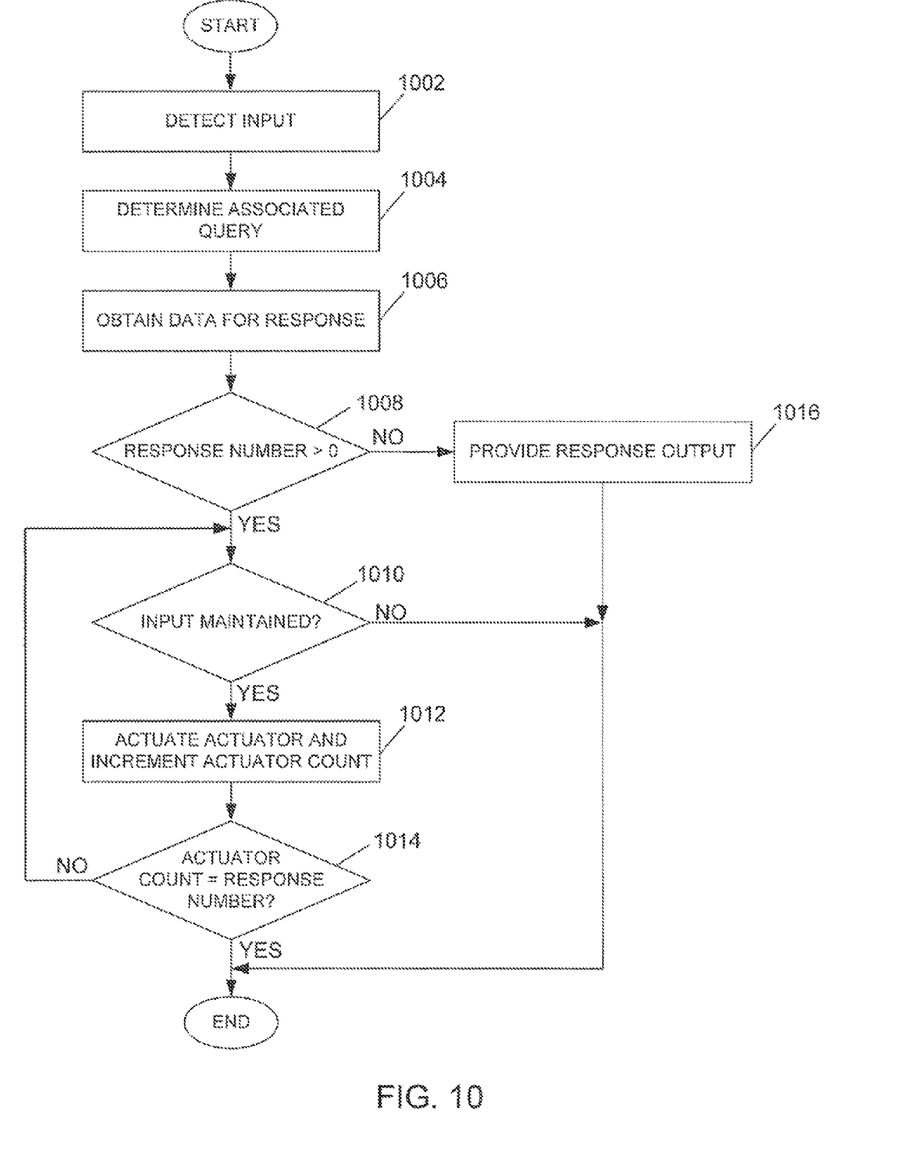
FIG. 10 is a flowchart illustrating an example of a method of controlling a portable electronic device.

A flowchart illustrating a method of controlling the portable electronic device 100 is shown in FIG. 10. The method may be carried out by software executed, for example, by the processor 102 in communication with the controller of the actuator 120. Coding of software for carrying out such a method is within the scope of a person of ordinary skill in the art given the present description. The method may contain additional or fewer processes than shown and/or described.

Input is detected at 1002. The input may be any suitable input such as, for example, a touch detected at the sensors 114. The touch may be any suitable touch including, for example, a touch on one sensor 114, a touch on multiple sensors 114, or a gesture on the sensors 114. The input received may be matched to a query at 1004. The query may be a query for any suitable information such as, the number of unopened electronic messages received, the number of new messages received, whether or not a calendar event record occurs within a time period, the number of calendar event records for a time period, a number of received phone calls, a number of minutes until the next scheduled calendar event, distance to a destination utilizing, for example, GPS or short-range communications 132 with a second electronic device, an indication of battery life remaining, for example, in percentage or a number of bars, strength of network connection in number of bars, a time of day, or any other suitable information. A single query may be associated with input or the query may be determined utilizing, for example, a look-up table to determine an associated query. Response data is obtained at 1006. The response data may be obtained from the portable electronic device 100 or may be obtained from a second electronic device, for example, in wireless communication with the portable electronic device 100.

When the response data, which in this example, is a number, is zero at 1008, a response output may optionally be provided at 1016. The response output may be, for example, vibration utilizing, for example, the actuator 120 or utilizing a vibration motor. The response output provides feedback that the input is received and differs from actuation of the actuator 120 a discrete number of times to reduce the chance of confusion between an output indicating zero and an output indicating a number that is greater than zero. For example, the vibration may be longer in duration than actuation of the actuator to strike the membrane to provide distinct output.

When the response number is greater than zero, the process continues at 1010. When the input is not maintained and therefore is no longer detected at 1010, the process ends. When the input detected at 1002 is maintained and therefore, still detected at 1010, the process continues at 1012. The actuator 120 is actuated at 1012 to provide a notification in the form of tactile output for the user. When the actuator 120 is actuated at 1012, an actuator count, which may be the number of times that the actuator 120 is actuated in response to the detected input, is incremented, for example, by 1. The actuator count is compared to the response number at 1014. When the actuator count is equal to the response number, the process ends. Otherwise, the process returns to 1010.

The actuator 120 is thereby actuated a discrete integer number of times based on the response number. In this example, the actuator 120 is actuated until an actuator count, which is related to the discrete integer number, is equal to the response number or until the input is no longer detected.

Thus, for example, the actuator 120 is actuated the discrete integer number of times unless the touch contact with the sensors 114 is discontinued before the actuator count equals the response number.

When the portable electronic device 100 is worn on or near the wrist of the user, actuation of the actuator 120 provides tactile output in the form of, for example, a pulsation or beat, as the membrane 410 is deflected when the actuator 120 strikes the membrane 410.

Continued reference is made to FIG. 10 to describe one example of the method. According to the present example, a touch on the sensors 114 is detected at 1002 when the user places a hand over the outer surface of the portable electronic device 100, in contact with the sensors 114. The touch on multiple sensors 114 is matched to a query 1004 for the number of new electronic messages received. The number of new electronic messages is obtained at 1006. For the purpose of this example, the number is 14. The response number is therefore greater than zero at 1008 and the process continues at 1010. Touch contact with the sensors 114 is maintained and the touch is still detected at 1010. The actuator 120 is actuated at 1012 and the actuator count, which in this example is the count of the number of times that the actuator 120 is actuated in response to the detected input, is incremented by 1. The process continues until the actuator 120 is actuated 14 discrete times.

According to another example, a touch on the sensors 114 is detected at 1002 when the user places a hand over the outer surface of the portable electronic device 100, in contact with the sensors 114. The touch on multiple sensors 114 is matched to a query 1004 for the number of new electronic messages received. The number of new electronic messages is obtained at 1006. For the purpose of this example, the number is 14. The response number is therefore greater than zero at 1008 and the process continues at 1010. Touch contact with the sensors 114 is maintained and the touch is still detected at 1010. The actuator 120 is actuated, for example, by providing a single large pulse and the actuator count is incremented by 10. The actuator count is not equal to the response number and the process continues at 1010. Touch contact with the sensors 114 is maintained and the touch is still detected at 1010. The actuator 120 is actuated, for example, by providing a single smaller pulse of less magnitude or duration at 1012 and the actuator count is incremented by 1. The process continues until the actuator count is 14. Thus, a different tactile output may be utilized to communicate different information, for example, 10 or some other number. The tactile output may be provided in an order to convey information in increasing order of granularity such that valuable information may still be provided if the user discontinues the input before all output is provided.

According to another example, a touch on the sensors 114 is detected at 1002 when the user places a hand over the outer surface of the portable electronic device 100 and in contact with the sensors 114. The touch on multiple sensors 114 is matched to a query 1004 for the number of new electronic messages received. The number of new electronic messages is obtained at 1006. For the purpose of this example, the number is 14. The response number is therefore greater than zero at 1008 and the process continues at 1010. Touch contact with the sensors 114 is maintained and the touch is still detected at 1010. The actuator 120 is actuated at 1012 and the actuator count is incremented by 1. The process continues and the actuator is repeatedly actuated. Touch contact with the sensors 114 is discontinued after the actuator 120 is actuated 7 times, for example. Actuation of the actuator 120 is discontinued. Thus, when the number of electronic messages received is very high, a user may determine that several messages are received, but may wish to discontinue the tactile output to avoid distraction.

User control of the tactile output is provided by discontinuing the output when the input is no longer detected. The longer the input is maintained, more information may be obtained. For example, when many unread email messages are received, input that is maintained for 1 second may be sufficient to provide output for the user to determine whether or not there are any unread messages. When input is maintained for 1 to 3 seconds, output may be provided for the user to determine that there are multiple unread email messages. When input is maintained for sufficient period of time to receive all output, the user may determine the approximate number of unread email messages and the exact number may be determined by an exact count. Thus, the length of time that the input is maintained may determine the amount of information conveyed by the output.

According to another example, a touch on two sensors 114 at opposing sides of the display 112 is detected at 1002 when the touches are detected, the two touches on the face 204 at opposing sides of the display 112 are matched to a query for a number of missed phone calls on the portable electronic device. The number of missed phone calls is obtained at 1006. For the purpose of this example, the number is 2. The response number is therefore greater than zero at 1008 and the process continues at 1010. Touch contact with the sensors 114 is maintained and the touch is still detected at 1010. The actuator 120 is actuated at 1012 and the actuator count is incremented by 1. The process continues and the actuator is actuated a second time.

In the above-described examples, the portable electronic device 100 is a PDA and includes features and functions of a handheld electronic communication device. In another example embodiment, the portable electronic device may function without a display. For example, the device may not have any display or, alternatively, may include an analog watch face and components of an analog watch. In alternative examples, the portable electronic device may include more or fewer functions and features.

Figure 11:
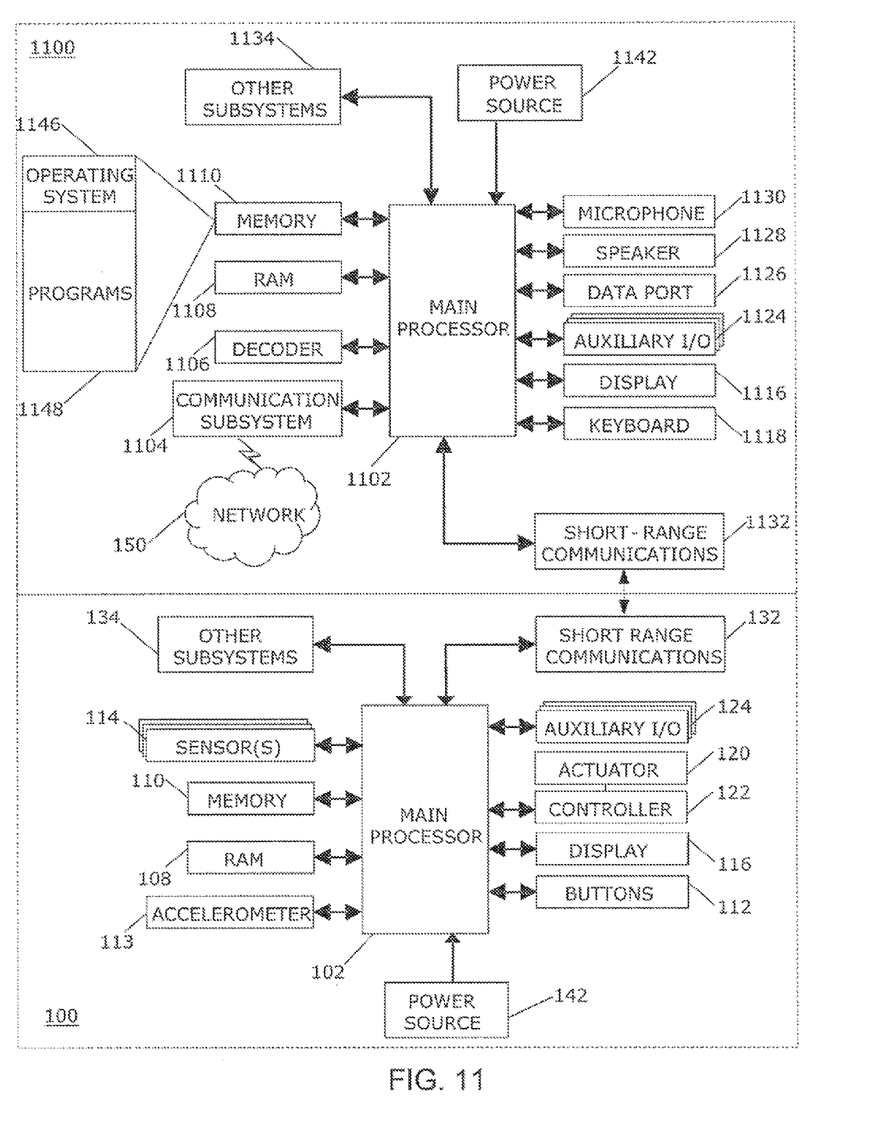
FIG. 11 is a simplified block diagram of components of a portable electronic device in short-range communication with a second electronic device, according to an example embodiment.

Alternatively, the portable electronic device may include short-range communication capabilities for communicating with a handheld electronic communication device or second electronic device but other communication capabilities may be absent from the device. Reference is made to FIG. 11 to describe an example of a portable electronic device that communicates, for example, with a handheld electronic communication device. Similar reference numerals are used herein to describe similar features of the portable electronic device. In this example, the portable electronic device 100 may include many of the features of the portable electronic device 100 shown in FIG. 1. In the present example, however, the portable electronic device includes short-range communications 132, for example, for communicating with the handheld electronic communication device 1100 but does not include a communication subsystem, for example. Features such as the microphone, speaker, data port, and other features may also be absent from the portable electronic device 100. Instead, the portable electronic device 100 communicates wirelessly, such as through Bluetooth™ communication with a second electronic device such as the handheld electronic communication device 1100. Thus, the portable electronic device in the present example may act as a peripheral device that communicates with the handheld electronic communication device 1100 and provides tactile output based on information stored at the handheld electronic communication device 1100.

The portable electronic device 100, which may be in the form of, for example, a watch, includes multiple components such as a processor 102 that controls the operations of the portable electronic device 100. Data communications are performed through the short-range communications 132. The portable electronic device 100 is a battery-powered device and includes a power source 142 such as a rechargeable battery or batteries.

The processor 102 also interacts with additional subsystems such as a Random Access Memory (RAM) 108, memory 110, buttons 112, an accelerometer 113, sensors 114, an optional display 116, an actuator 120, an auxiliary input/output (I/O) subsystem 124, and other device subsystems 134. User interaction with the graphical user interface of the portable electronic device 100 may be performed through the buttons 112 and the sensors 114. The processor 102 may interact with the actuator 120 through the controller 122. The processor 102 may also interact with the sensors 114 via an electronic controller.

As indicated, the portable electronic device 100 may communicate with the handheld electronic communication device 1100 which includes many of the features of the portable electronic device 100. In the present example, the handheld electronic communication device 1100 may perform communication functions, including data and voice communications which are performed through a communication subsystem 1104. Data received by the portable electronic device 1100 may be decompressed and decrypted by a decoder 1106. The communication subsystem 1104 receives messages from and sends messages to a wireless network 150. The wireless network 150 may be any type of wireless network, including, but not limited to, data-centric wireless networks, voice-centric wireless networks, and dual-mode networks that support both voice and data communications over the same physical base stations. The portable electronic device 100 is a battery-powered device and includes a power source 1142 such as a rechargeable battery or batteries.

The processor 1102 of the handheld communication device 1100 also interacts with additional subsystems such as a Random Access Memory (RAM) 1108, memory 1110, a keyboard 1118, a display 1116, an auxiliary input/output (I/O) subsystem 1124, a data port 1126, a speaker 1128, a microphone 1130, short-range communications 1132 and other device subsystems 1134. The short-range communications 1132 are utilized to communicate with the portable electronic device 100, which in the present example is a peripheral device.

Information such as a text message, an e-mail message, or web page download is processed by the communication subsystem 1104 and input to the processor 1102. The processor 1102 then processes the received signal for output to the display 1112. Information may also be sent from the handheld electronic communication device 1100 to the portable electronic device 100 and data, in the form of, for example, a query or queries may be received at the handheld electronic communication device 1100 from the portable electronic device 100.

Communication between the handheld electronic communication device 1100 and the portable electronic device 100 may be initiated in any suitable manner. For example, communication may be initiated by selection of an option to search for peripheral devices utilizing the handheld electronic communication device 1100 when the portable electronic device 100 is within suitable range for operation of the short-range communications. Communication may also be initiated by selection of an option to listen for peripheral devices, for example. Alternatively, or in addition, communication may be initiated via the portable electronic device 100.

Figure 12:
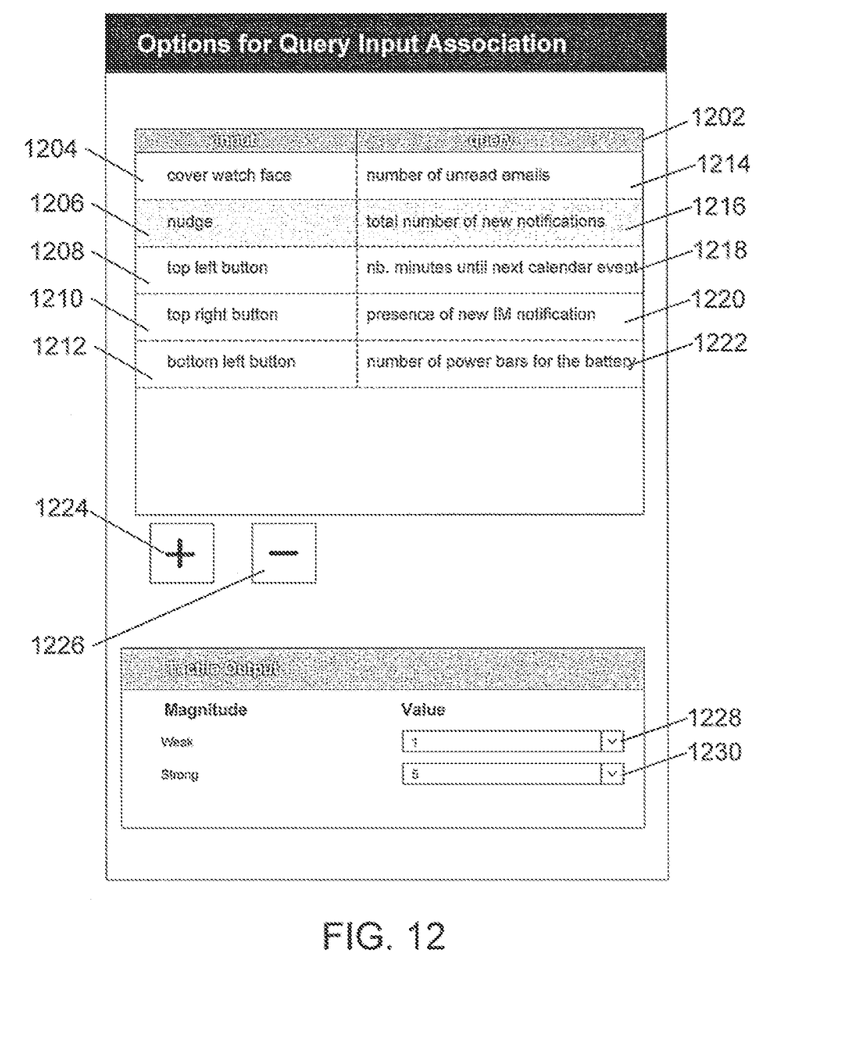
FIG. 12, FIG. 13, and FIG. 14 illustrate example screen shots of the display of the second electronic device during configuring the portable electronic device.
Figure 13:
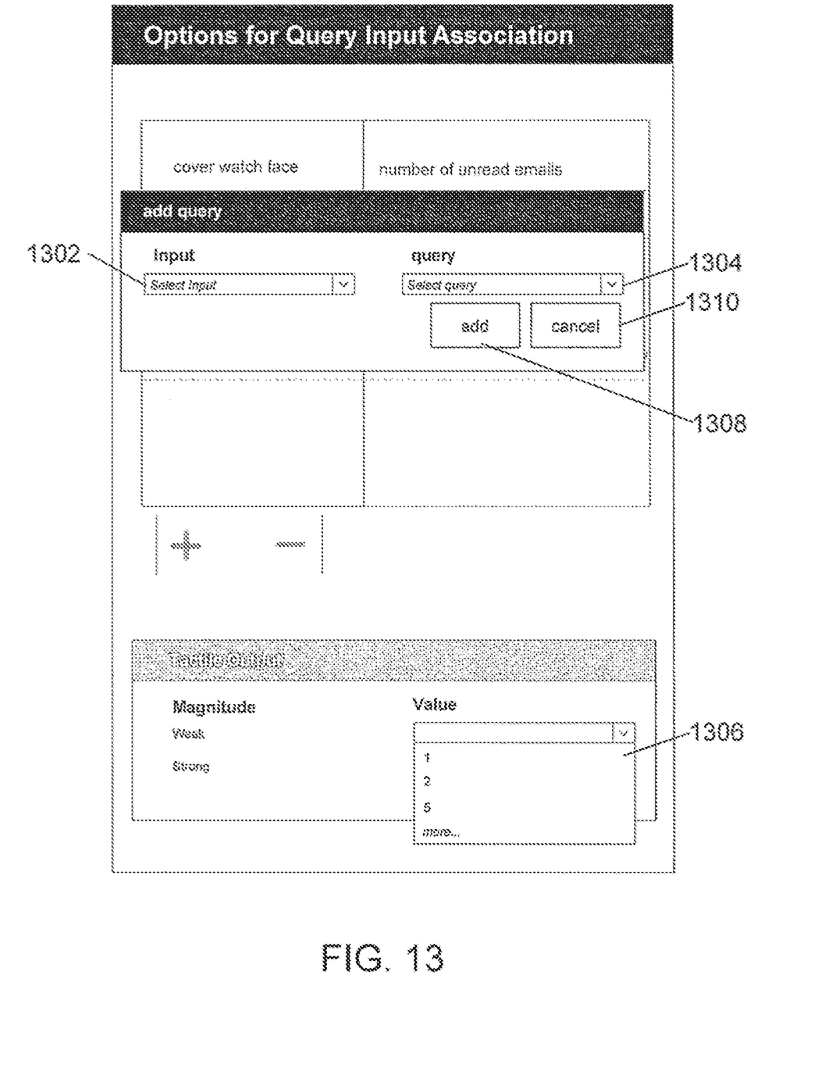
Figure 14:
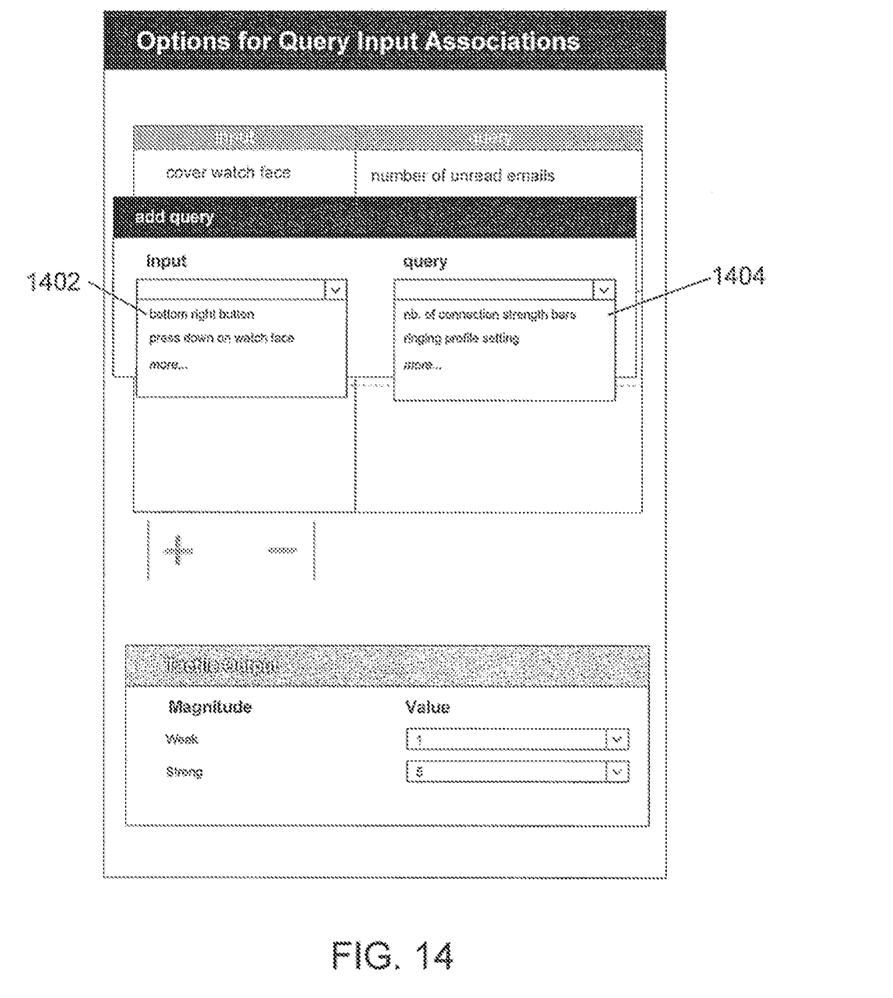

FIG. 12 through FIG. 14 show example screen shots of the display 1112 of the handheld electronic communication device 1100 to configure the portable electronic device 100 utilizing the handheld electronic communication device 1100. There are many methods of configuring the portable electronic device 100 and FIG. 12 through FIG. 14 illustrate one example only.

In the screen shot illustrated in FIG. 12, queries may be associated with input at the portable electronic device 100 may be set utilizing, for example, the display 116, which may be a touch-sensitive display, or utilizing an auxiliary I/O 124 such as an optical joystick, trackball, trackwheel, or other suitable device 124. The options may be accessed, for example, by selection of a query to input association option in a menu or submenu on the handheld electronic communication device 1100. Inputs that are received at the portable electronic device 100 are matched with respective queries in the table 1202 illustrated. In the example illustrated, five inputs are associated with five respective queries such that each defined input is associated with a respective query. The five inputs include, for example, "cover watch face" 1204, which may be detected utilizing the sensors 114 on the portable electronic device 100, "nudge" 1206, which may be detected utilizing the accelerometer 113, "top left button" 1208, which may be detected utilizing one of the buttons 112, "top right button" 1210, which may be detected utilizing another of the buttons 112, and "bottom left button" 1212, which may be detected utilizing yet another of the buttons 112. The associated queries include a number of unread emails 1214, a total number of new notifications 1216, a number of minutes until the next calendar event 1218, a presence of a new instant message 1220, and a number of power bars 1222 representing battery life. Other queries may also be utilized such as a number of calendar events in a time period, a number of new messages from a social networking website, or any other suitable query.

Both the inputs and the queries that are associated with the inputs are selectable and may be set utilizing the handheld electronic communication device, for example. An add query option 1224 and a delete query option 1226 are also provided to facilitate addition and deletion of associations of queries with input.

The tactile output that is provided by the portable electronic device 100 in response to the input, may also be selectable. The tactile output includes a setting to associate a magnitude of the output, e.g., a force of the actuator, which, when a piezo actuator is utilized, may be controlled by controlling the voltage across the piezo actuator, to an integer number. In the present example, a weak output and a strong output may each be associated with a selectable integer, as illustrated by the pull-down menus 1228, 1230, respectively.

To add an input associated with a query, a user may select the add query option 1224 using a suitable selection method. In response to selection of the add query option 1224, an input may be selected for the new query as illustrated by the drop-down menu 1302 shown in FIG. 13 The associated query may also be selected as illustrated by the drop-down menu 1304. Upon selection of the drop-down menu 1302, a menu list of selectable inputs 1402 is displayed as illustrated in FIG. 14. Any one of the selectable inputs in the menu list 1402 may be selected in any suitable manner. Inputs that are already associated with queries may be removed from the drop-down menu or may not be selectable so that a conflict in which more than one query is associated with a single input, does not occur. Upon selection of the drop-down menu 1304 shown in FIG. 13, a menu list of selectable queries 1404 is displayed as illustrated in FIG. 14. Any one of the selectable queries in the menu list of selectable queries 1404 may be selected in any suitable manner.

The associated tactile output may also be selected for the query. As illustrated, a menu list of selectable integer numbers 1306 may be displayed upon selection of the pull-down menu 1228 (shown in FIG. 12) associated with the weak output. A similar menu list may be displayed upon selection of the pull-down menu 1230 associated with the strong output. The tactile output may also be pre-set or default values may be associated. The pre-set or default tactile output may also be dependent on the query.

When the input, query and the tactile output are each selected in the present example, the input and associated query is added by selection of, for example, the "add" key 1308. Alternatively, the user may discontinue and exit without adding the input and associated query by selection of, for example, a "cancel" key 1310.

When an input is received at the portable electronic device 100, the input may be associated with the query at the portable electronic device 100 based on the associations set at the handheld electronic communication device 1100. Alternatively, input signals may be sent from the portable electronic device 100 to the handheld electronic communication device 1100 where the signals are associated with the query.

To delete an input associated with a query, a user may select the query, for example by highlighting the query in any suitable manner, followed by selection of the delete query option 1226.

Figure 15:
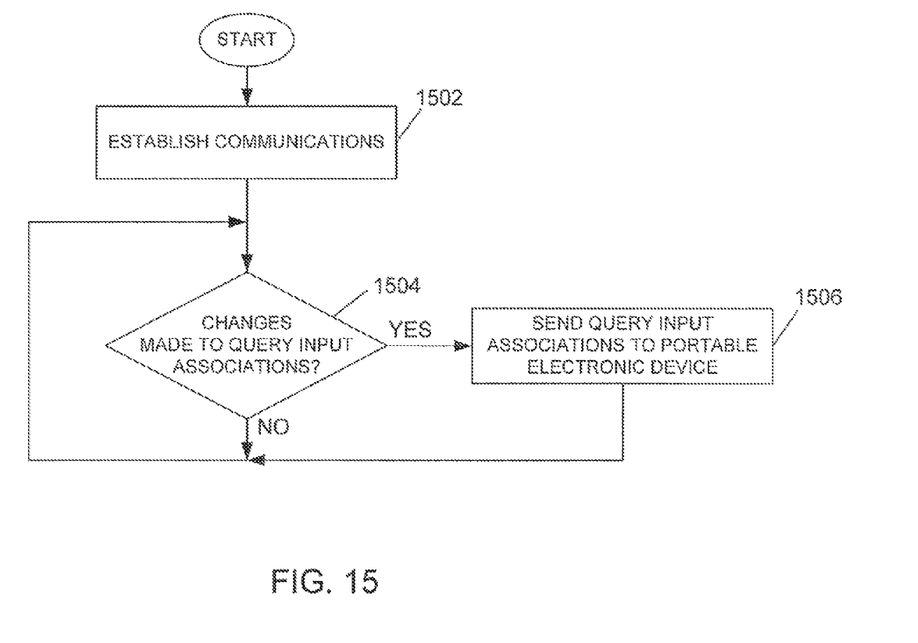
FIG. 15 is a flowchart illustrating an example of a method of controlling a portable electronic device utilizing a second electronic device, in accordance with an embodiment.

Reference is made to FIG. 15 to describe a method of controlling the portable electronic device 100 utilizing the handheld electronic communication device 1100. Communications are established at 1502. When changes are made to the associations between the queries and input at 1504, the changes are sent to the portable electronic device at 1506. The changes may be detected in any suitable manner.

Reference is again made to FIG. 10 as well as FIG. 11 to describe an example of a method of controlling the portable electronic device 100. According to the present example, a touch on the sensors 114 is detected at 1002 when the user places a hand over the outer surface of the portable electronic device 100, in contact with the sensors 114. The touch on multiple sensors 114 is matched to a query 1004 for the number of unread email messages and the associated query is determined. The number of unread email messages, or messages marked unopened, is obtained at 1006 by sending the query to the handheld electronic communication device 1100 and the handheld electronic communication device 1100 responds with the number of unread email messages. For the purpose of this example, the number is 14. The response number is therefore greater than zero at 1008 and the process continues at 1010. Touch contact with the sensors is maintained and the touch is still detected at 1010. The actuator 120 is actuated utilizing the strong magnitude to provide a relatively strong output compared to the weak output at 1012 and the actuator count is incremented by 5. The process continues by actuating the actuator 120 a discrete number of times until the actuator count is equal to 14.

In an alternative example, a peripheral device may also be utilized to receive an input, such as a touch or gesture on the peripheral device and to send data to a second electronic device. The second electronic device provides the response. Thus, the second electronic device receives input in the form of data from the peripheral device and carries out the method of FIG. 10.

The electronic device is described as a wristwatch for the purpose of providing an example. The electronic device 100 is not limited to a watch. For example, the electronic device may be a wristband, a necklace, a device worn around the upper arm, or a handheld device including a handheld device that may be hidden in a closed hand. The electronic device may also be a device that is hidden under clothing or placed in a pocket and the input is not limited to input utilizing touch sensors. Instead, the input may be received via force sensors or a button on the device.

According to another example, the actuator may be a vibrator device such as a vibrator motor to cause vibration of the portable electronic device. In this example, the vibrator motor is controlled to provide a number of discrete vibrations. Thus, rather than a piezo actuator, the vibrator motor is turned on for short, discrete periods of time to provide the tactile output.

Other actuators may also be utilized. For example, a voice-coil transducer may be utilized, an electrostimulation transducer, solenoid, or any other suitable actuator may be utilized to actuate and thereby provide tactile output a discrete number of times.

Advantageously, tactile output is provided from a portable electronic device in contact with the skin of a user to provide information to the user without requiring viewing of a display. Such information may be useful, for example, when a user is in a meeting, driving a vehicle, or in any other instance in which viewing of a display is difficult, dangerous, or disruptive. Control of tactile output in touch-sensitive devices is provided as the tactile output may be discontinued by the user.

According to one aspect, a method of controlling an electronic device includes detecting receipt of an input, determining a response number in response to receipt of the input, and actuating an actuator of the electronic device a discrete integer number of times based on the response number.

According to another aspect, an electronic device is provided. The electronic device includes a housing, an actuator disposed in the housing, and a processor configured to control actuation of the actuator to cause the electronic device to detect receipt of an input, determine a response number in response to receipt of the input, and actuate an actuator of the electronic device a discrete integer number of times based on the response number.

According to another aspect, a portable electronic device includes short range communications for communicating with a second electronic device, a first input device to receive a first input, an actuator to provide tactile output, and a processor connected to the short range communications, the first input device, and the actuator, to send a first query to the second electronic device in response to receipt of the first input and actuate the actuator to output a response.

According to another aspect, a method of controlling a portable electronic device utilizing a second electronic device includes establishing communications with the portable electronic device, and associating a first input at the portable electronic device with a first query for information stored on the second electronic device such that the information is received for providing tactile output at the portable electronic device in response to receipt of the first input at the portable electronic device.

While the embodiments described herein are directed to particular implementations of the actuating assembly and the portable electronic device and the, it will be understood that modifications and variations may occur to those skilled in the art. All such modifications and variations are believed to be within the sphere and scope of the present disclosure.

What is claimed is:

1. A method of controlling an electronic device, comprising:
   detecting receipt of an input;
   determining a response number in response to receipt of the input by communicating with a second electronic device and receiving the response number from the second electronic device; and
   actuating an actuator at the electronic device a discrete integer number of times based on the response number.

2. The method according to claim 1, comprising determining an associated query based on the input received.

3. The method according to claim 2, wherein determining the response number comprises sending the query to the second electronic device.

4. The method according to claim 1, wherein communicating comprises communicating wirelessly with the second electronic device.

5. The method according to claim 1, wherein actuating comprises repeatedly actuating the actuator until the discrete integer number equals the response number or until the input is discontinued.

6. The method according to claim 1, wherein the discrete integer number equals the response number.

7. The method according to claim 1, comprising determining that the input is maintained and, in response, actuating the actuator the discrete number of times.

8. The method according to claim 1, wherein the response number comprises a number of electronic messages received.

9. The method according to claim 1, wherein the response number comprises a number of new electronic messages.

10. The method according to claim 1, wherein actuating the actuator comprises controlling the actuator to strike a surface the discrete number of times to provide the tactile output.

11. The method according to claim 1, wherein actuating the actuator comprises charging and discharging a piezoelectric actuator to strike a surface to provide the tactile output.

12. The method according to claim 1, wherein actuating the actuator comprises controlling a vibrator motor to provide tactile output the discrete number of times.

13. A non-transitory computer-readable medium having computer-readable code executable by at least one processor of a portable electronic device to perform the method according to claim 1.

14. An electronic device comprising:
   a housing;
   an actuator disposed in the housing; and
   a processor coupled to the actuator to cause the electronic device to carry out the method according to claim 1.

* * * * *